United States Patent
Stankavich et al.

(10) Patent No.: US 11,168,653 B2
(45) Date of Patent: Nov. 9, 2021

(54) VEHICLE AIR CLEANER

(71) Applicant: Honda Motor Co., Ltd., Tokyo (JP)

(72) Inventors: Paul D. Stankavich, Columbus, OH (US); Atul Gupta, Dublin, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 280 days.

(21) Appl. No.: 16/395,813

(22) Filed: Apr. 26, 2019

(65) Prior Publication Data
US 2020/0340434 A1 Oct. 29, 2020

(51) Int. Cl.
| | |
|---|---|
| *B01D 46/00* | (2006.01) |
| *B01D 46/10* | (2006.01) |
| *B01D 46/42* | (2006.01) |
| *B01D 46/44* | (2006.01) |
| *F02M 35/02* | (2006.01) |
| *F02M 35/12* | (2006.01) |
| *F02M 35/024* | (2006.01) |

(52) U.S. Cl.
CPC ..... *F02M 35/1255* (2013.01); *B01D 46/0004* (2013.01); *B01D 46/0027* (2013.01); *B01D 46/0049* (2013.01); *B01D 46/4236* (2013.01); *B01D 46/444* (2013.01); *F02M 35/021* (2013.01); *F02M 35/024* (2013.01); *F02M 35/0205* (2013.01); *B01D 2279/60* (2013.01)

(58) Field of Classification Search
CPC ............ B01D 46/0004; B01D 46/0049; B01D 46/0027; B01D 46/10; B01D 46/4236; B01D 46/444; B01D 2279/60; F02M 35/1255; F02M 35/0205; F02M 35/021; F02M 35/024

USPC .......... 55/218, 283, 502, 498, 514, DIG. 28; 95/273; 123/198 E; 96/380, 383, 386
See application file for complete search history.

(56) References Cited

U.S. PATENT DOCUMENTS

| | | | | |
|---|---|---|---|---|
| 2,080,574 | A * | 5/1937 | McCoy | F22B 37/54 96/210 |
| 2,962,121 | A * | 11/1960 | Wilber | B01D 46/2411 55/480 |
| 3,013,628 | A * | 12/1961 | Jacobs | F23J 15/027 422/173 |
| 3,048,959 | A * | 8/1962 | Lowther | F02M 35/022 55/320 |
| 3,078,650 | A * | 2/1963 | Anderson | B01D 46/2411 55/337 |

(Continued)

*Primary Examiner* — Minh Chau T Pham
(74) *Attorney, Agent, or Firm* — Rankin, Hill & Clark LLP

(57) ABSTRACT

An air cleaner for a vehicle includes a case having an air inlet pipe and an air outlet pipe. A cover is removably attached to the case for covering an open top portion of the case. With the cover attached to the case an interior of the air cleaner defines a flow passage directed through the air cleaner from the air inlet pipe to the air outlet pipe. A filter element is received in the interior and is arranged over the flow passage. The flow passage immediately downstream of the filter element includes an elbow-shaped section for redirecting airflow from the filter element toward the air outlet pipe. The elbow-shaped section is provided with at least one first guide rib shaped correspondingly to the elbow-shaped section. The flow passage upstream of the air outlet pipe defines a branching section formed as an acoustic resonator for reducing air intake noise.

20 Claims, 5 Drawing Sheets

(56) References Cited

U.S. PATENT DOCUMENTS

| | | | | |
|---|---|---|---|---|
| 3,147,100 A | * | 9/1964 | Wilber | F02M 31/066 |
| | | | | 55/419 |
| 3,169,844 A | * | 2/1965 | Young | F02M 35/024 |
| | | | | 55/498 |
| 3,201,927 A | * | 8/1965 | Wachter | A62B 23/00 |
| | | | | 55/504 |
| 3,319,404 A | * | 5/1967 | Lowther | B01D 46/2411 |
| | | | | 55/432 |
| 6,267,006 B1 | | 7/2001 | Bugli et al. | |
| 6,899,081 B2 | | 5/2005 | Bielicki et al. | |
| 8,052,780 B2 | * | 11/2011 | Rotter | B01D 50/002 |
| | | | | 95/273 |
| 8,061,323 B2 | | 11/2011 | Konzelmann et al. | |
| 8,419,834 B2 | * | 4/2013 | Rotter | B01D 46/0002 |
| | | | | 95/268 |
| 9,212,637 B2 | | 12/2015 | Kimura et al. | |
| 10,006,416 B2 | | 6/2018 | Aydin et al. | |

* cited by examiner

VEHICLE AIR CLEANER

BACKGROUND

An intake system of a vehicle generally includes an air intake for supplying outside air to an engine and an air cleaner having an air inlet pipe in communication with the air intake. The air cleaner typically houses a filter element for filtering out dirt and other particulate matter that may be entrained in the outside air flowing through the intake duct. An acoustic resonator is generally disposed on an upstream side of the filter element to reduce noise and vibration from the engine that can be transmitted and amplified by flow passages formed by the intake system. Further, for the accurate calibration and operation of the engine, a correct measurement of airflow rate is required. Therefore, an airflow meter can be installed in an air outlet pipe of the air cleaner.

BRIEF DESCRIPTION

According to one aspect, an air cleaner for a vehicle comprises a case having an air inlet pipe and an air outlet pipe connected thereto. A cover is removably attached to the case for covering an open top portion of the case. With the cover attached to the case an interior of the air cleaner defines a flow passage directed through the air cleaner from the air inlet pipe to the air outlet pipe. A filter element is received in the interior of the air cleaner and is arranged over the flow passage. The flow passage immediately downstream of the filter element includes an elbow-shaped section for redirecting airflow from the filter element toward the air outlet pipe. The elbow-shaped section is provided with at least one first guide rib shaped correspondingly to the elbow-shaped section. The flow passage upstream of the air outlet pipe defines a branching section formed as an acoustic resonator for reducing air intake noise.

According to another aspect, an air cleaner for a vehicle comprises a case having an air inlet pipe and an air outlet pipe connected thereto. A cover is removably attached to the case for covering an open top portion of the case. With the cover attached to the case an interior of the air cleaner defines a flow passage directed through the air cleaner from the air inlet pipe to the air outlet pipe. A filter element is received in the interior of the air cleaner and is arranged over the flow passage immediately downstream of the air inlet pipe. The flow passage immediately downstream of the filter element includes an elbow-shaped section for redirecting airflow from the filter element toward the air outlet pipe. The elbow-shaped section is provided with at least two first guide ribs shaped correspondingly to the elbow-shaped section. The flow passage upstream of the air outlet pipe defines a branching section formed as an acoustic resonator for reducing air intake noise. One of the case and the cover includes a second guide rib positioned adjacent an opening area of the branching section for reducing air turbulence at the opening area.

According to another aspect, an air cleaner for a vehicle comprises a case having an air inlet pipe and an air outlet pipe located on a common side wall of the case. A cover is removably attached to the case for covering an open top portion of the case. With the cover attached to the case an interior of the air cleaner defines a curved flow passage directed through the air cleaner from the air inlet pipe to the air outlet pipe. A filter element is received in the interior of the air cleaner and is arranged over the flow passage immediately downstream of the air inlet pipe. The flow passage immediately downstream of the filter element includes an elbow-shaped section for redirecting airflow from the filter element toward the air outlet pipe. The elbow-shaped section is provided with first guide ribs shaped correspondingly to the elbow-shaped section. The flow passage upstream of the air outlet pipe defines a branching section formed as an acoustic resonator for reducing air intake noise, and one of the case and the cover includes a second guide rib positioned adjacent an opening area of the branching section for reducing air turbulence at the opening area. An airflow meter is mounted to the air outlet pipe with a meter main body located in the air outlet pipe. The air outlet pipe includes a pair airflow stabilizing third guide ribs extending in an axial direction of the air outlet pipe and having distal ends upstream of the meter main body.

DETAILED DESCRIPTION

It should, of course, be understood that the description and drawings herein are merely illustrative and that various modifications and changes can be made in the structures disclosed without departing from the present disclosure. It will also be appreciated that the various identified components of the exemplary air cleaner for a vehicle disclosed herein are merely terms of art that may vary from one manufacturer to another and should not be deemed to limit the present disclosure.

Figure 1:
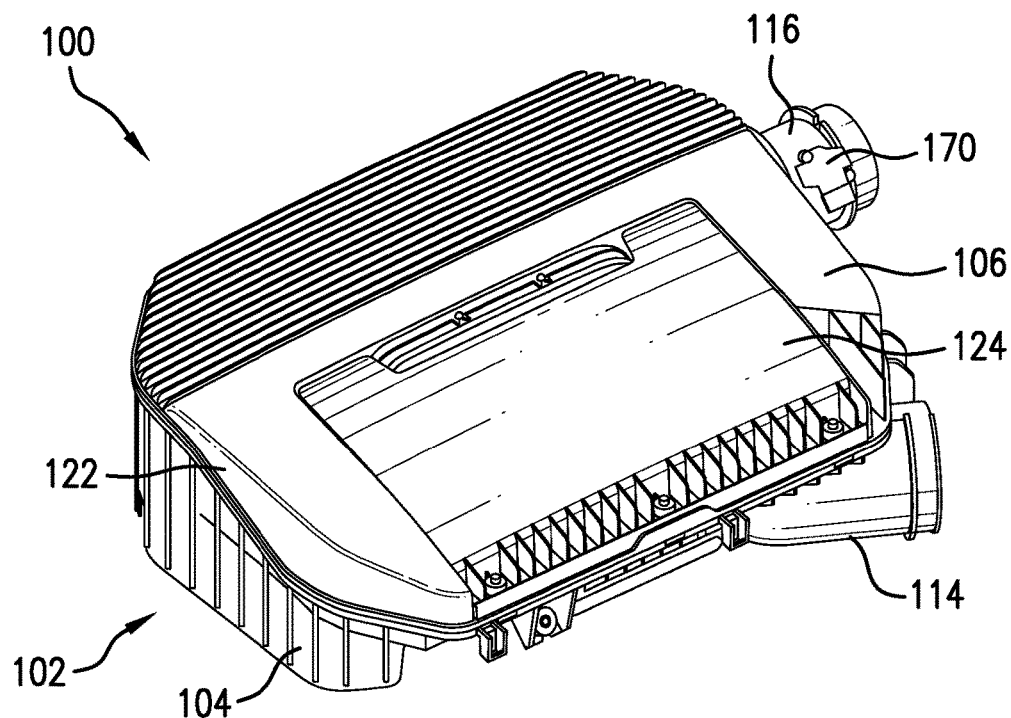
FIG. 1 is a perspective view of an air cleaner for a vehicle according to the present disclosure.
Figure 2:
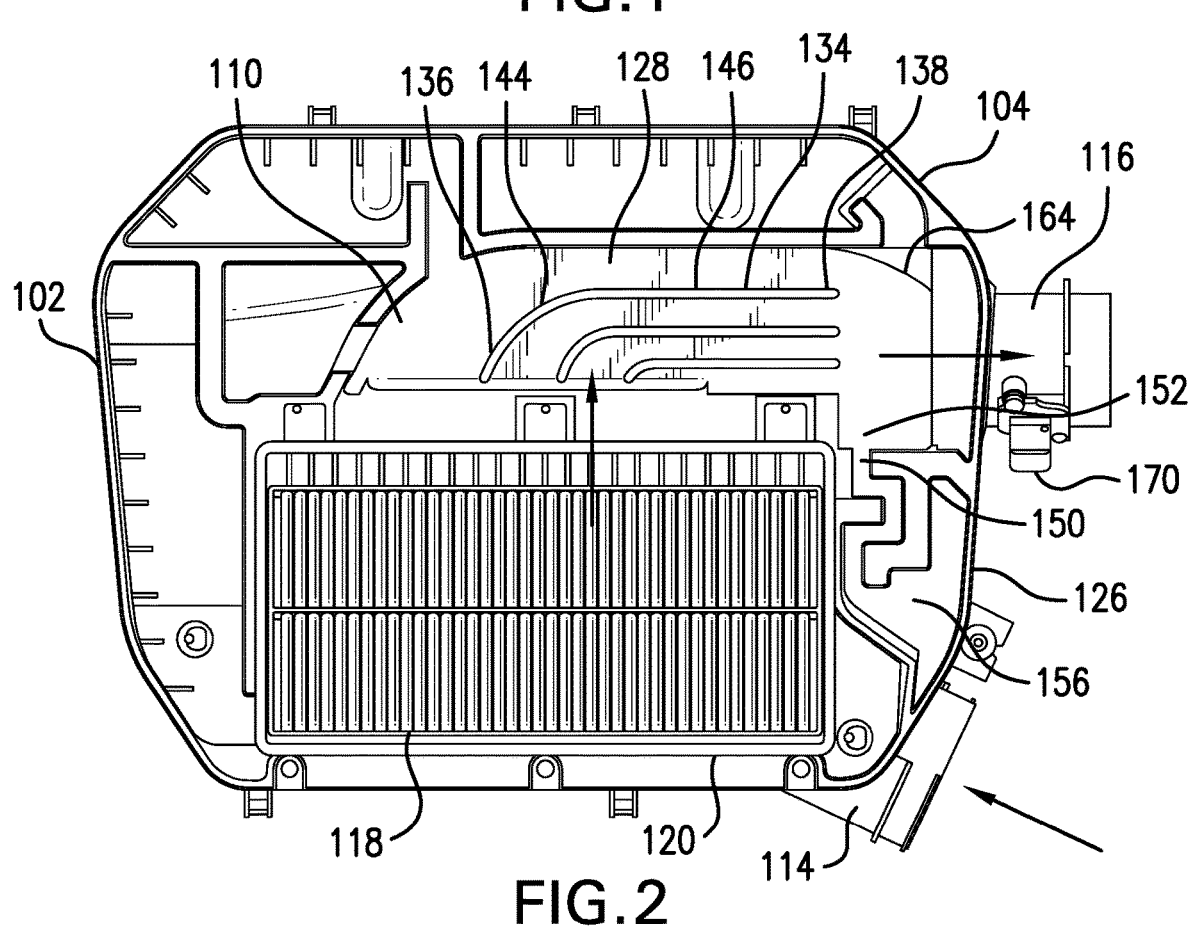
FIG. 2 is a top plan view of a case of the air cleaner with a cover removed.
Figure 3:
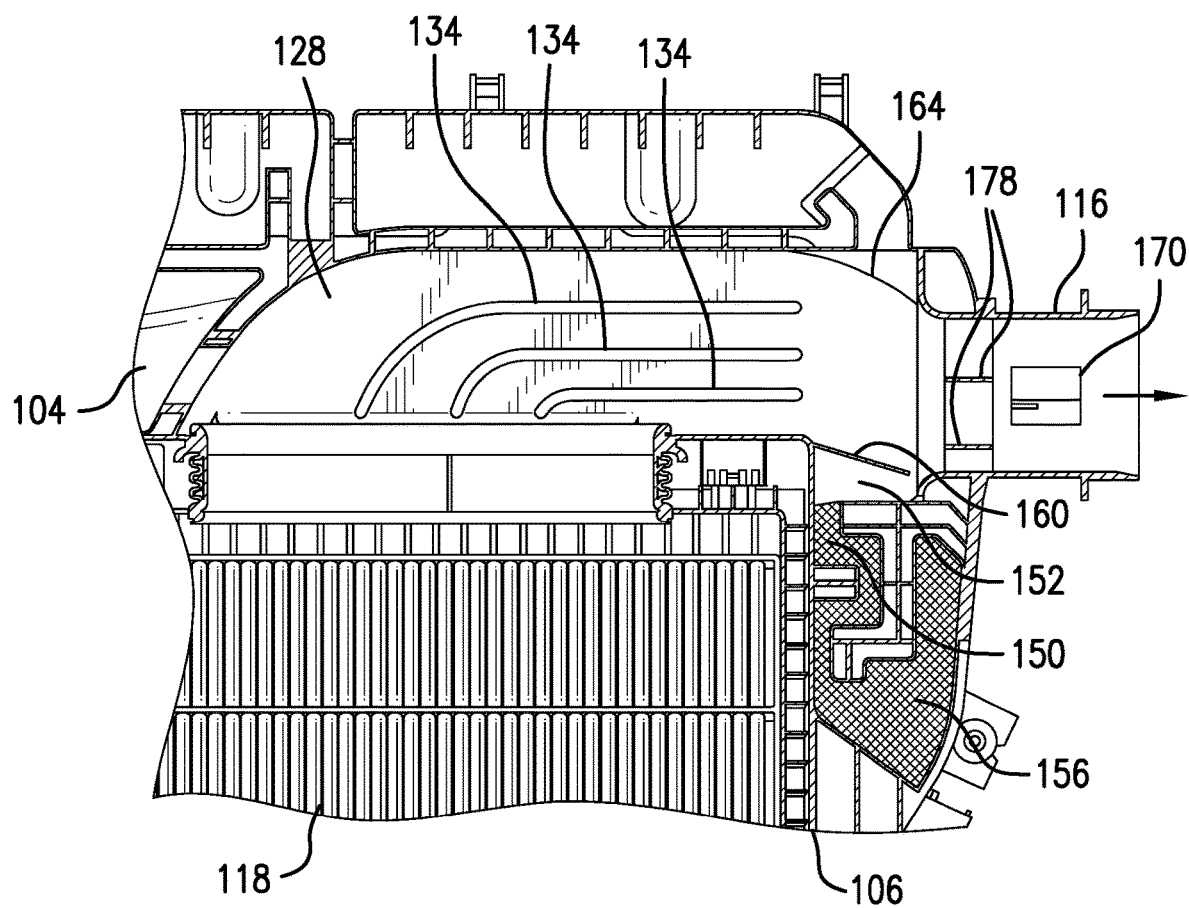
FIGS. 3, 4, 5, 6, 7 and 8 are partial cross-sectional views of the air cleaner depicting various airflow guide ribs for directing air through the air cleaner from an air inlet pipe to an air outlet pipe.

Referring now to the drawings, wherein like numerals refer to like parts throughout the several views, FIGS. 1-3 illustrate an exemplary air cleaner 100 for a vehicle according to the present disclosure. The air cleaner 100 includes a housing 102 defined by a case 104 and a separate cover 106 attached to the case for covering an open top portion of the case. With the cover 106 attached to the case 104 an interior of the air cleaner 100 defines a flow passage 110 to direct airflow through the air cleaner from an air inlet pipe 114 to the air outlet pipe 116 (see airflow arrows in FIG. 2). A filter element 118, such as a planar air filter, is received in a filter accommodating portion 120 provided in the interior of the air cleaner 100 and is arranged over the flow passage for filtering airflow through the air cleaner 100. The air inlet pipe 114 is connected to the filter accommodating portion 120 so that outside air can be introduced into the filter accommodating portion. The air outlet pipe 116 is downstream of the filter element 118 to communicate filtered air to the vehicle engine. As shown, the cover 106 can include a first cover part 122 fixedly attached to the case 104 (e.g., by vibration welding) and a second cover part 124 removably attached to the case 104 for providing access to the filter element 118.

In the depicted aspect, and in a top plan view of the air cleaner 100, the air inlet pipe 114 and the air outlet pipe 116 are located on a common side wall 126 of the case 104. With this arrangement, the flow passage 110 immediately downstream of the filter accommodating portion 120 for the filter element 118 includes an elbow-shaped section 128 for redirecting airflow approximately ninety degrees from the filter element 118 toward the air outlet pipe 116. With the shape of the flow passage 110, the airflow through the air cleaner 100 can create unwanted turbulence. According to the present disclosure, the air cleaner 100 includes internal air guides configured to limit turbulence of the air flowing through the flow passage 110 of the air cleaner 100. According to one aspect, the internal air guides comprise at least one first guide rib 134 provided in the elbow-shaped section 128 which is shaped correspondingly to the elbow-shaped section. The at least one first guide rib 134 has a proximal end 136 located at an entrance of the elbow-shaped section 128 and a distal end 138 upstream of an inlet of the air outlet pipe 116. Further, the at least one first guide rib 134 includes a curved section 144 matching the curvature of the elbow-shaped section 128 and a straight section 146 extended toward the air outlet pipe 116. Therefore, the at least one first guide rib 134 turns the airflow approximately ninety degrees and creates a laminar flow toward the inlet of the air outlet pipe 116. Accordingly to one embodiment, the at least one first guide rib 134 includes a pair of equally spaced first guide ribs with proximal ends 136 located at the entrance of the elbow-shaped section 128 and distal ends aligned upstream of the inlet of the air outlet pipe 116. More particularly, according to the depicted embodiment, the at least one first guide rib 134 includes three equally spaced first guide ribs with proximal ends located at an entrance of the elbow-shaped section and distal ends aligned upstream of the inlet of the air outlet pipe 116.

With continued reference to FIGS. 1-3, the housing 102 of the exemplary air cleaner 100 defines a branching section 150 upstream of the air outlet pipe 116 and in communication with the flow passage 110. The branching section 150 has an opening area 152, and as depicted, the opening area 152 is immediately downstream of the distal end 138 of the at least one first guide rib 134. The branching section 150 is adapted and formed as an acoustic resonator 156 (i.e., an expansion chamber) that can be tuned to reduce air intake noise. It should be appreciated that with the integrated resonator 156, the footprint of the air cleaner 100 within the engine compartment of the vehicle can be reduced.

Figure 4:
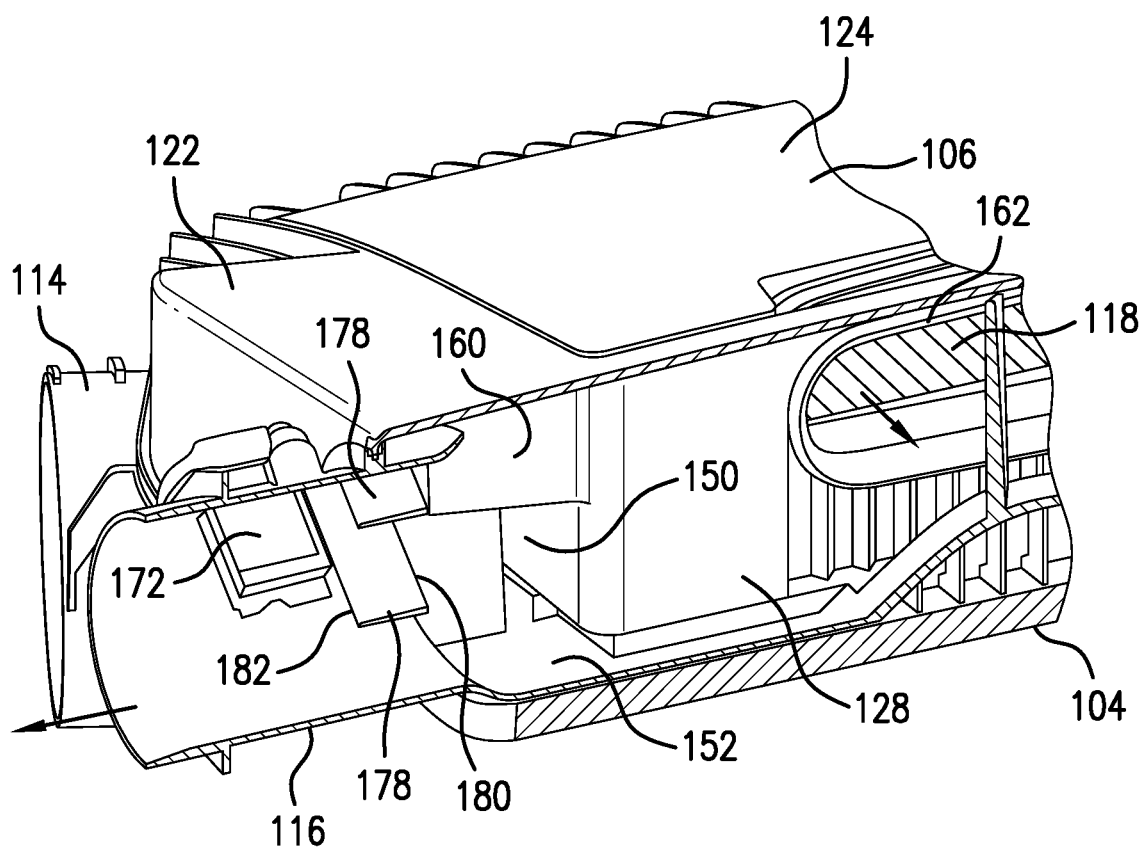
Figure 5:
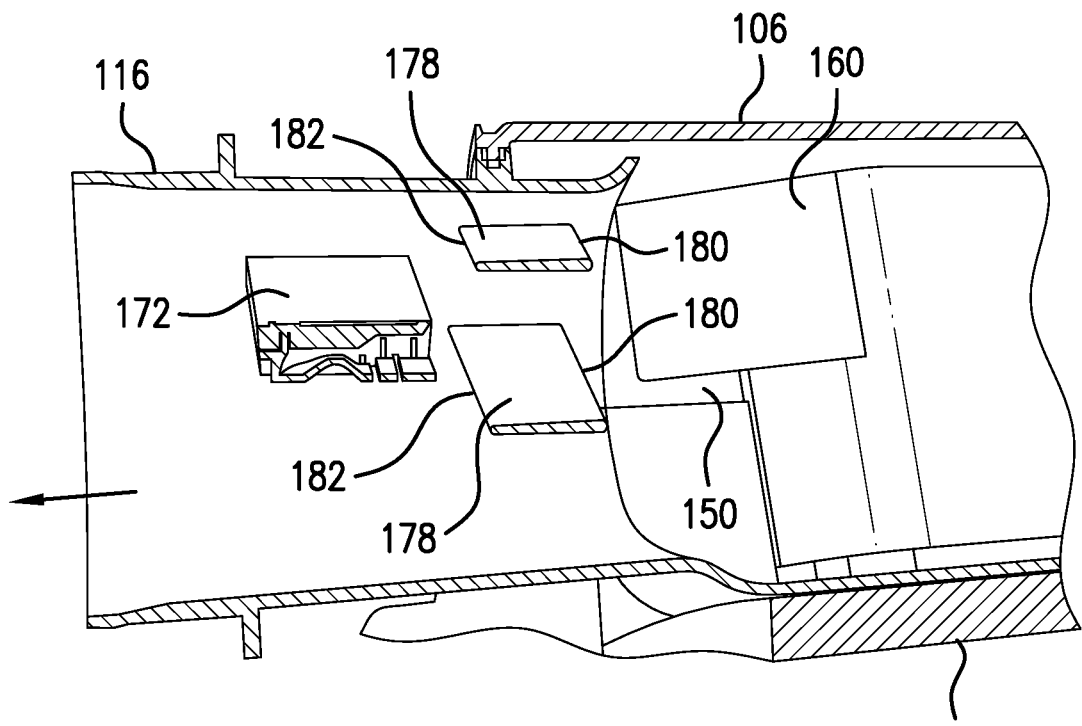

Because the opening area 152 of the branching section 150 can generate turbulence which can deteriorate overall airflow performance of the air cleaner 100, the housing 102 (i.e., one of the case 104 and the cover 106) includes a second guide rib 160 positioned adjacent the opening area 152. The second guide rib 160 is adapted to reduce airflow turbulence at the opening area 152 while maintaining sufficient opening area at the branching section 150 to not adversely affect the acoustic performance (i.e., frequency and attenuation amplitude) of the resonator 156. As best depicted in FIGS. 3-5, the second guide rib 160 is formed as part of the cover 106 and is canted inwardly toward the branching section 150. The second guide rib 160 is also vertically aligned with the entrance 162 of the elbow-shaped section 128 to prevent any disruption of the laminar flow created by the elbow-shaped section 128. According to one aspect, the second guide rib 160 can serve as an extension of the elbow-shaped section 128 and can span a majority of a distance across the opening area 152 from the distal end 138 of the at least one first guide rib 134 to the inlet of the air outlet pipe 116. In the depicted aspect of the air cleaner 100, a longitudinal axis of the air outlet pipe 116 is parallel to and offset from a longitudinal axis of the elbow-shaped section 128 of the flow passage 110. Therefore, it should be appreciated that the second guide rib 160 is oriented and positioned to direct airflow directly into the inlet of the air outlet pipe 116. Further, because of this offset arrangement of the longitudinal axes, a wall 164 defined by the housing 102 immediately downstream of the distal end 138 of the at least one first guide rib 134 is curved toward the inlet of the air outlet pipe 116.

Figure 6:
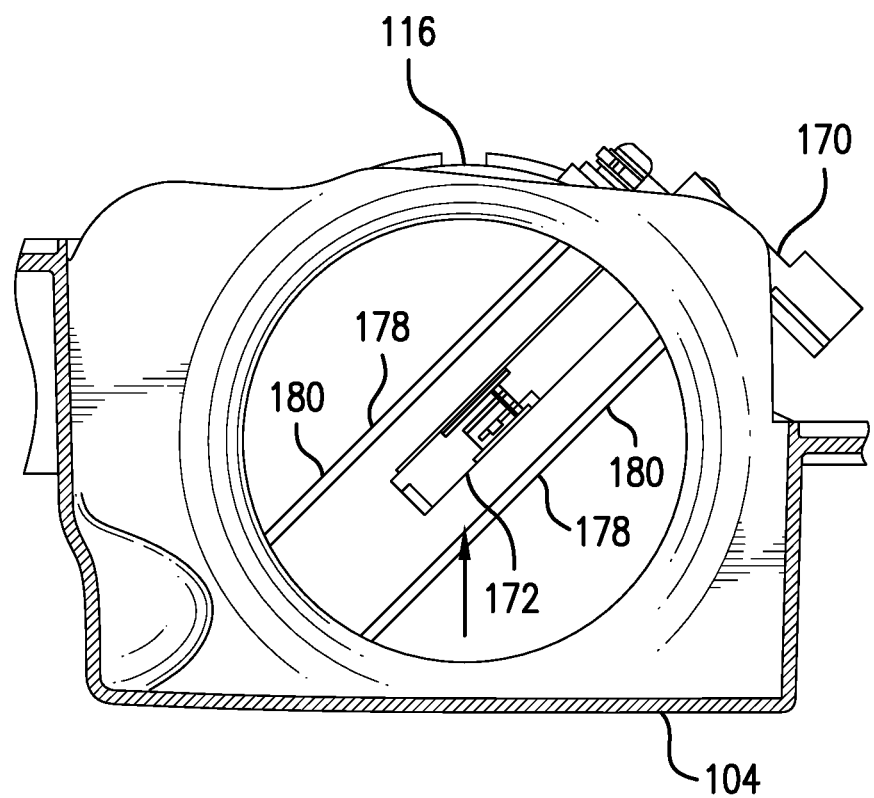
Figure 7:
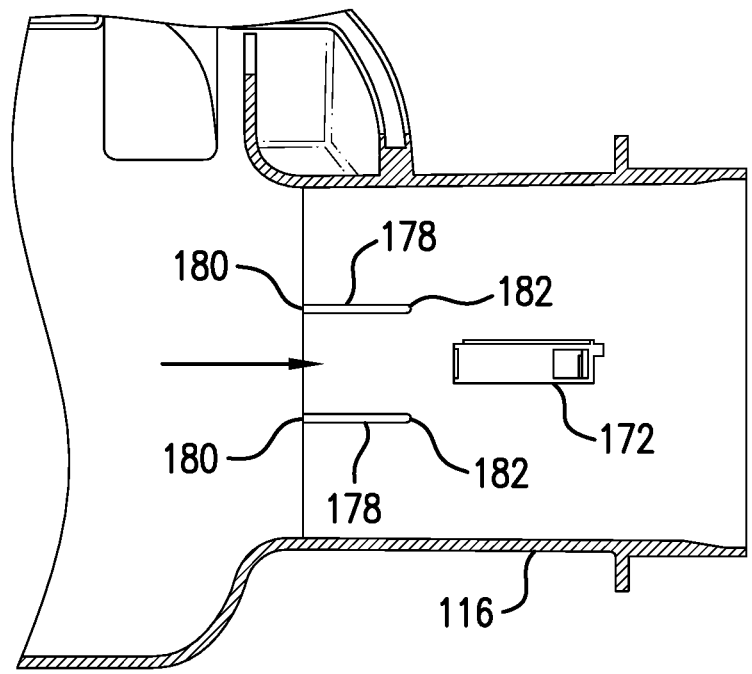
Figure 8:
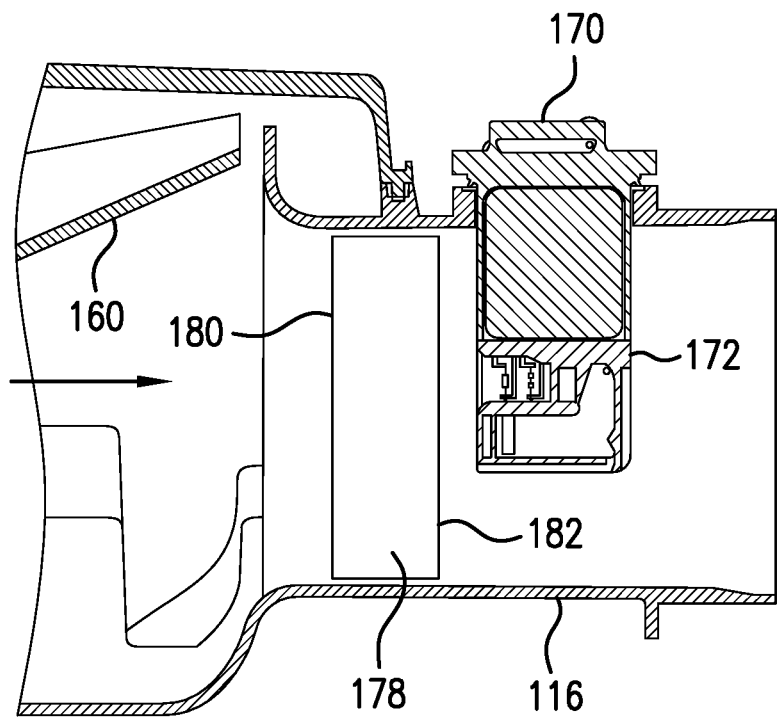

With reference now to FIGS. 6-8, to provide an accurate measurement of the airflow rate through the air cleaner 100, an airflow meter 170 is mounted to the air outlet pipe 116. The airflow meter 170 has a meter main body 172 located in the air outlet pipe 116 and adapted to detect the intake air amount. Typically, the meter main body 172 has an inside flow passage for allowing some of the air through the air outlet pipe 116 to flow. To stabilize any remaining turbulence prior to the airflow passing across the meter main body 172, the inlet of the air outlet pipe 116 includes a pair of airflow stabilizing third guide ribs 178 which extend in the flowing direction of the airflow through the air outlet pipe 116. More particularly, the third guide ribs 178 are located upstream of the meter main body 172 and extend in an axial direction of the air outlet pipe 116, with proximal ends 180 of the third guide ribs 178 located at the inlet of the air outlet pipe 116 and distal ends 182 of the third guide ribs 178 spaced upstream of the meter main body 172. The third guide ribs 178 are oriented relative to the meter main body 172 so that imaginary planes defined by the third guide ribs 178 flank the meter main body. In the depicted aspect, the third guide ribs 178 extend parallel to the meter main body 172. Therefore, by having the third guide ribs 178 at the inlet of the air outlet pipe 116, the airflow in the vicinity of the meter main body 172 can be stabilized. Further, because the third guide ribs 178 extend in the axial direction of the air outlet pipe 116, pressure loss of the airflow through the air cleaner 100 can be reduced.

Accordingly, the exemplary air cleaner 100 includes internal air guides, which function to direct airflow through the air cleaner 100 along a complex pathway between the air inlet pipe 114 and the air outlet pipe 116. The air guides are configured to limit turbulence of the airflow, which is directed past the airflow meter 170 located in the air outlet pipe 116. The air guides include the first guide ribs 134 located adjacent the filter element 118. As shown, the first guide ribs 134 are curved correspondingly to the shape of the elbow-shaped section 128 to turn the airflow approximately 90 degrees. The air guides include the single second guide rib 160 downstream of the first guide ribs 134 and adjacent the acoustic resonator 156. The second guide rib 160 limits turbulence that would otherwise be created by the opening area 152 of the resonator 156 without affecting the acoustic performance of the resonator. The air guides also include the third guide ribs 178 located within the air outlet pipe 116 upstream of the airflow meter 170 to stabilize the airflow passing across the airflow meter 170.

It will be appreciated that the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An air cleaner for a vehicle comprising:
  a case having an air inlet pipe and an air outlet pipe connected thereto, a cover removably attached to the case for covering an open top portion of the case, wherein with the cover attached to the case an interior of the air cleaner defines a flow passage directed through the air cleaner from the air inlet pipe to the air outlet pipe, wherein a filter element is received in the interior of the air cleaner and is arranged over the flow passage, the flow passage immediately downstream of the filter element includes an elbow-shaped section for redirecting airflow from the filter element toward the air outlet pipe, the elbow-shaped section is provided with at least one first guide rib shaped correspondingly to the elbow-shaped section, and the flow passage downstream of the at least one first guide rib and upstream of the air outlet pipe defines a branching section formed as an acoustic resonator for reducing air intake noise.

2. The air cleaner of claim 1, wherein the at least one first guide rib includes a pair of equally spaced first guide ribs with proximal ends located at an entrance of the elbow-shaped section and distal ends terminating at an opening area of the branching section.

3. The air cleaner of claim 1, wherein the at least one first guide rib includes three equally spaced first guide ribs with proximal ends located at an entrance of the elbow-shaped section and distal ends terminating at an opening area of the branching section.

4. The air cleaner of claim 1, wherein an opening area of the branching section is downstream of a distal end of the at least one first guide rib.

5. The air cleaner of claim 1, wherein one of the case and the cover includes a second guide rib positioned adjacent an opening area of the branching section for reducing air turbulence at the opening area.

6. The air cleaner of claim 5, wherein the second guide rib is formed as part of the cover.

7. The air cleaner of claim 5, wherein the second guide rib is canted inwardly toward the branching section and spans a majority of a distance from a distal end of the at least one first guide rib to an inlet of the air outlet pipe.

8. The air cleaner of claim 1, wherein an airflow meter is mounted to the air outlet pipe with a meter main body located in the air outlet pipe, and the air outlet pipe includes a pair of airflow stabilizing third guide ribs upstream of the meter main body and extending in an axial direction of the air outlet pipe, wherein imaginary planes defined by the third guide ribs flank the meter main body.

9. The air cleaner of claim 8, wherein proximal ends of the third guide ribs are located at an inlet of the air outlet pipe, and distal ends of the third guide ribs are spaced upstream of the meter main body.

10. The air cleaner of claim 1, wherein in top plan view the air inlet pipe and the air outlet pipe are located on a common side wall of the case.

11. An air cleaner for a vehicle comprising:
a case having an air inlet pipe and an air outlet pipe connected thereto, a cover removably attached to the case for covering an open top portion of the case, wherein with the cover attached to the case an interior of the air cleaner defines a curved flow passage directed through the air cleaner from the air inlet pipe to the air outlet pipe, wherein a filter element is received in the interior of the air cleaner and is arranged over the flow passage immediately downstream of the air inlet pipe, the flow passage immediately downstream of the filter element includes an elbow-shaped section for redirecting airflow from the filter element toward the air outlet pipe, the elbow-shaped section is provided with at least two first guide ribs shaped correspondingly to the elbow-shaped section, the flow passage upstream of the air outlet pipe defines a branching section formed as an acoustic resonator for reducing air intake noise, and one of the case and the cover includes a second guide rib positioned adjacent an opening area of the branching section for reducing air turbulence at the opening area.

12. The air cleaner of claim 11, including three equally spaced first guide ribs with proximal ends located at an entrance of the elbow-shaped section and distal ends terminating at the opening area of the branching section.

13. The air cleaner of claim 11, wherein the opening area of the branching section is downstream of distal ends of the at least two first guide ribs.

14. The air cleaner of claim 11, wherein the second guide rib is formed as part of the cover, and the second guide rib is vertically aligned with an entrance of the elbow-shaped section.

15. The air cleaner of claim 11, wherein an airflow meter is mounted to the air outlet pipe with a meter main body located in the air outlet pipe, and the air outlet pipe includes a pair of airflow stabilizing third guide ribs extending in an axial direction of the air outlet pipe and having distal ends upstream of the meter main body.

16. The air cleaner of claim 15, wherein imaginary planes defined by the third guide ribs flank the meter main body.

17. An air cleaner for a vehicle comprising:
a case having an air inlet pipe and an air outlet pipe located on a common side wall of the case, a cover removably attached to the case for covering an open top portion of the case, wherein with the cover attached to the case an interior of the air cleaner defines a curved flow passage directed through the air cleaner from the air inlet pipe to the air outlet pipe, wherein a filter element is received in the interior of the air cleaner and is arranged over the flow passage immediately downstream of the air inlet pipe, the flow passage immediately downstream of the filter element includes an elbow-shaped section for redirecting airflow from the filter element toward the air outlet pipe, the elbow-shaped section is provided with first guide ribs shaped correspondingly to the elbow-shaped section, wherein the flow passage upstream of the air outlet pipe defines a branching section formed as an acoustic resonator for reducing air intake noise, and one of the case and the cover includes a second guide rib positioned adjacent an opening area of the branching section for reducing air turbulence at the opening area, wherein an airflow meter is mounted to the air outlet pipe with a meter main body located in the air outlet pipe, and the air outlet pipe includes airflow stabilizing third guide ribs extending in an axial direction of the air outlet pipe and having distal ends upstream of the meter main body.

18. The air cleaner of claim 17, including three equally spaced first guide ribs with proximal ends located at an entrance of the elbow-shaped section and distal ends terminating at the opening area of the branching section.

19. The air cleaner of claim 17, wherein second guide rib is formed as part of the cover, the second guide rib is canted inwardly toward the branching section and away from an inlet of the air outlet pipe.

20. The air cleaner of claim 18, wherein a longitudinal axis of the air outlet pipe is parallel to and offset from a longitudinal axis of the elbow-shaped section of the flow passage, and the second guide rib is adapted to direct airflow to an inlet of the air outlet pipe.

\* \* \* \* \*